United States Patent [19]
Friedman et al.

[11] 3,873,798
[45] Mar. 25, 1975

[54] CRAWLING CARRIAGE

[75] Inventors: Robert Friedman; Howard D. Lesher, both of Saugus, Calif.

[73] Assignee: Dimetrics, Inc., N. Hollywood, Calif.

[22] Filed: Nov. 9, 1973

[21] Appl. No.: 414,286

[52] U.S. Cl............. 219/60 A, 219/125 R, 228/29, 228/32, 266/23 NN
[51] Int. Cl............................................. B23k 9/02
[58] Field of Search......... 219/125 R, 60 A; 228/25, 228/27, 29, 32, 45; 266/23 N, 23 NN

[56] References Cited
UNITED STATES PATENTS

| | | | |
|---|---|---|---|
| 3,176,897 | 4/1965 | Tucker | 219/60 A |
| 3,266,701 | 8/1966 | Peignon | 228/27 |
| 3,527,918 | 9/1970 | Fielder et al. | 219/125 R |
| 3,604,612 | 9/1971 | Miller et al. | 219/60 A |
| 3,718,798 | 2/1973 | Randolph et al. | 719/60 A |
| 3,727,025 | 4/1973 | Dibenedetto | 219/60 A |
| 3,737,614 | 6/1973 | Paulange | 219/60 A |
| 3,753,525 | 8/1973 | Homes | 228/32 |
| 3,783,223 | 1/1974 | Gwin et al. | 219/60 A |

*Primary Examiner*—Bruce A. Reynolds
*Attorney, Agent, or Firm*—Pastoriza & Kelly

[57] ABSTRACT

A carriage is equipped with one or more drive rollers and a pair of relatively low-slung swing arms carrying idler wheels arranged beneath the drive roller or rollers. A track unit is integrally formed with a pair of side parts that define a pair of undercut guide ways. The carriage may be positioned with the roller or rollers resting in rolling engagement on the track unit and the idler wheels swung beneath and into rolling engagement with the undercut guide ways. A motor is operatively engaged with the drive roller or rollers through a slip drive clutch mechanism. The carriage crawls along the track unit with the drive rollers forced down against the track unit and the idler wheels snugged upwardly by a locking mechanism against their corresponding guide ways.

20 Claims, 4 Drawing Figures

PATENTED MAR 25 1975 3,873,798
SHEET 1 OF 2
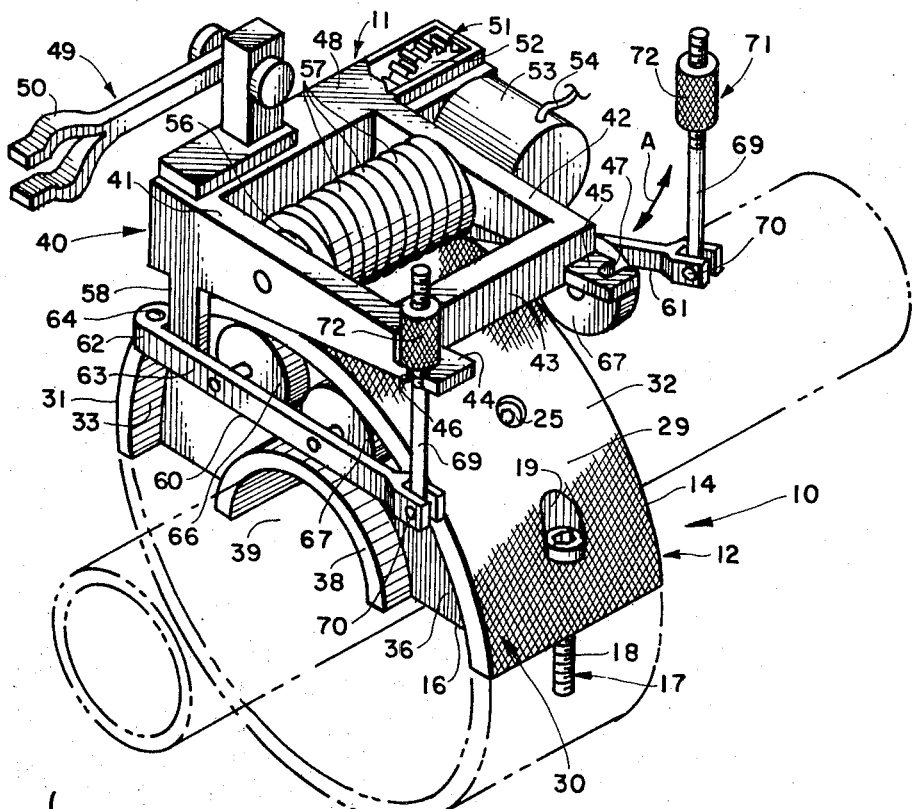
FIG. 1
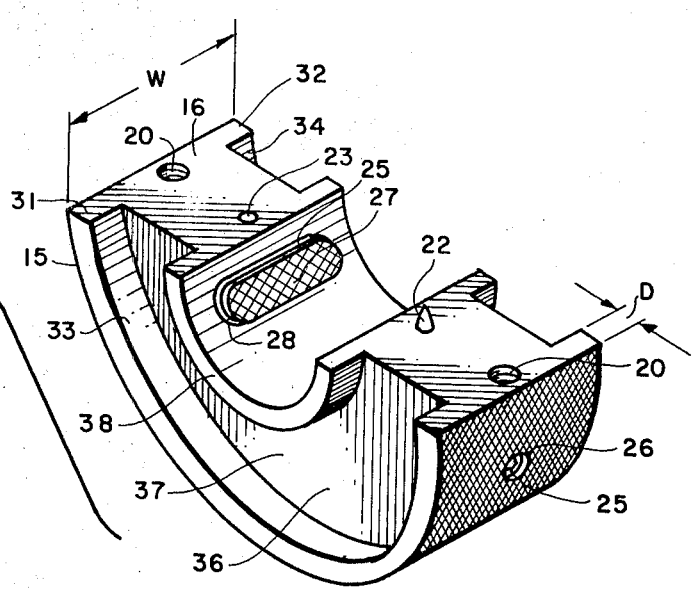

CRAWLING CARRIAGE

BACKGROUND OF THE INVENTION

This invention generally relates to transport mechanisms and more specifically to carriages confined to movement over fixed tracks.

Carriage and track systems in general are well known and have for example been used to transport and maneuver welding equipment orbitally around a weld joint.

In one type of carriage and track assembly for welding purposes, the weld head drive consists essentially of a split ring gear which is contained in a split guide ring. This assembly is hinged at one point and may be opened up, clam-shell wise, for placement over the pipe to be welded. Over center toggle clamps lock the assembly on the pipe. The ring gear is driven around the guide track by means of a motor worm gear drive assembly which is integral with the guide ring assembly. The weld head proper is fastened so the ring gear is carried around the pipe by its motion.

In another type of conventional carriage and track assembly used for welding purposes, the weld head drive consists of a specially fabricated chain having wide, flat links which are coupled together and clamped around the pipe to form a guiding surface for the carriage. A belt is applied around the pipe to be welded along with the chain-like guide track and provides the surface upon which the weld head carriage drive rollers can propel the head around the pipe. The belt must be cut to remove the weld head from the pipe when making closeout welds. If the welded assembly has a free end, then the belt may be slipped along the pipe and removed over the end.

The carriage and track unit assembly of this invention may be broadly used for many different purposes and especially to assist in precision welding operations.

SUMMARY OF THE INVENTION

Briefly stated, this invention relates to a unique carriage and track unit combination which in its broader aspects includes a track unit with side parts that define undercut zones constituting a pair of guide ways.

A carriage includes a framework. Drive roller means is coupled to the framework and arranged in rolling engagement with the track unit. The motor is coupled to the framework and is operatively connected to the drive roller means for selectively causing movement of the drive roller means over the track unit.

A pair of swing arms are pivotally coupled to opposing sides of the framework. Idler wheel means is secured to the swing arms and idler wheels are positioned below the drive roller means for movement into rolling engagement with the pair of guide ways. Locking means is provided for tightening the swing arms and thereby simultaneously forcing the drive roller means against the track unit and the idler wheel means against the guide ways.

The carriage is caused to crawl around the track unit with the drive roller means exerting force against the track unit in one direction and the idler wheel means exerting force against the track unit in the opposite direction.

In accordance with one specific embodiment, the drive roller means includes dual and tandemly aligned drive rollers and the idler wheel means includes single idler wheels secured to corresponding swing arms and positioned centrally of the dual drive rollers.

In another specific embodiment, the drive roller means includes a single drive roller and the idler wheel means includes a set of idler wheels coupled to each swing arm with each set having a pair of idler wheels arranged on opposite sides of the single drive roller axis.

The drive roller preferably has a flexible covering in order to improve traction with the track unit. The flexible covering may consist of a plurality of resilient O-rings arranged in side-by-side relationship substantially across each drive roller.

The track unit may be rectilinear or annular or of some other suitable configuration. One particular track unit is of generally annular shape and includes mating split ring sections that are detachably fastened together. The track unit further includes a pedestal and a hub connected to the pedestal having a generally circular opening in order to accommodate a tubular workpiece such as a pipe to be welded. A clamping means incorporates at least three adjustable and substantially equiangularly spaced centering paths which extend radially through the split ring sections.

The track unit further includes locating pins and apertures which are positioned at the mating end portions of the split ring sections in order to assist in orienting and fitting the split ring sections together.

The swing arms straddle the track unit and are pivoted to swing laterally inwardly towards the framework to facilitate positioning the idler wheels beneath the track unit side parts.

The locking means preferably includes a pair of locking slots formed in the framework and a pair of tie bolts pivotally connected to corresponding swing arms and having free ends which extend through the corresponding locking slots. Tightening elements are connected to the tie bolt free ends for regulating the holding force exerted by the drive roller means and idler wheel means against the track unit.

Compensating means may be provided and coupled to the locking means to allow slight displacement of the idler wheel means upon encountering irregular surface conditions on the track unit. this compensating means may be in the form of a pair of coil springs which act as take up elements that are positioned over the tie bolts and between the locking slots and tightening elements.

A slip clutch mechanism is positioned between the drive motor and drive roller means and is structured to cause slippage when a predetermined torque is exerted on the power take-off shaft of the motor.

In a modified embodiment of this invention a cross framework is coupled to an outside portion of the principal framework and oscillating means is provided for selectively shifting the cross framework laterally relative to the paths of movement of the principal framework. The oscillating means includes a slide and way system interconnecting the principal framework and cross framework. A reversible motor is mounted to the principal framework and is drivingly engaged with the slide and way system and is arranged to shift the cross framework back and forth.

The carriage and track combination in general may be combined with an automatic pipe welding system, some parts being mounted to the carriage. The automatic pipe welding system may include a welding torch connected to one side of the carriage, a wire positioner connected to the same side of the carriage and a filler wire feeder means for supplying filler wire through the wire positioner and to the welding torch.

BRIEF DESCRIPTION OF THE DRAWINGS

The numerous benefits and unique aspects of the present invention will be fully understood when the following detailed description is studied in conjunction with the drawings in which:

FIG. 1 is a perspective, exploded and partially sectional view showing a carriage and track unit assembly, constructed in accordance with this invention;

DETAILED DESCRIPTION OF THE PREFERRED EMBODIMENT

Figure 2:
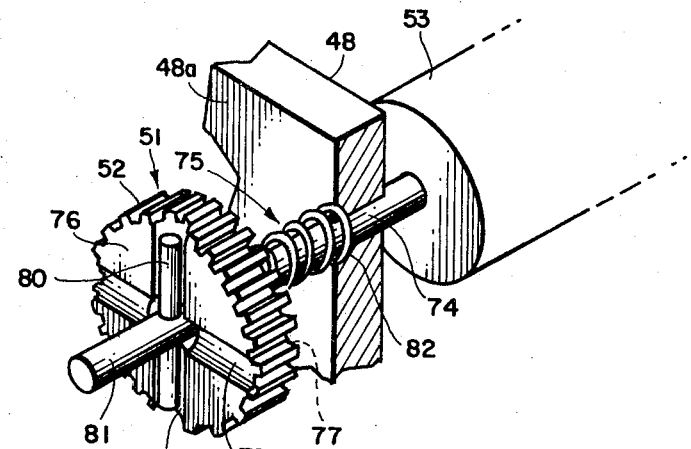
FIG. 2 is a perspective, sectional view of a slip clutch mechanism coupled to the power take-off shaft of the drive motor.

Referring now to the drawings and FIG. 1 in particular a carriage and track assembly 10 is shown having two principal components, i.e., a carriage 11 and a special track unit 12 shown generally clamped over a tubular workpiece or pipe 13.

The track unit 12 may be rectilinear, annular or of any other suitable configuration but for purposes of illustration, it is shown as generally annular or torus in shape. In this particular embodiment the track unit 12 has a pair of mating split ring sections 14 and 15 that may be detachably secured together by way of a conventional fastening means 17.

Fastening means 17 includes two or more elongated bolts that have captive socket heads positioned or counter-sunk within recesses 19, one of which is shown at 18 present in split ring section 14. The recesses are associated with threaded bolt holes aligned to register with threaded bolt holes 20, one of which is shown present in the other split ring section 15.

To assist in aligning the split ring sections 14 and 15. locating pins 22 and associated locating apertures 23 are provided on the mating end portions 16 of the split ring sections 14 and 15.

Clamping means is provided in the form of adjustable centering elements 25 that pass through radial openings 26 extending between the outer periphery 29 of track unit 12 and the inner circumference of track unit 12. The inner portion of the radial openings 26 terminate in oblong shaped recesses 28. The outermost ends of the centering elements 25 have socketed heads, like the socketed heads associated with elongated bolts 18. The innermost tips of the adjustable centering elements 25 are formed with silicone rubber pads 27 or the like that may contain short pieces of stainless steel wire directed radially inwardly to provide superior gripping force. At least three equiangularly spaced adjustable centering elements are provided, as shown in FIG. 1, although six or eight or any other number greater than three could be installed.

The track unit 12 incorporates an outermost support or pedestal 30 whose exterior periphery 29 defines a central path of movement. Outer surface 29 is knurled, etched, subjected to course sandblasting, etc., in order to provide a roughened surface or finish for achieving better traction.

Pedestal 30 has outwardly directed side parts 31 and 32 which overhang and define undercut zones 33 and 34. These undercut zones 33 and 34 serve as circular guide ways located fully beneath the track unit exterior surface 29. The guide ways 33 and 34 and larger diameter exterior surface 29 provide paths over which carriage 11 may orbit around the stationary track unit 12. The pedestal width W is substantially constant around the track unit 12 and the depth D of side parts 31 and 32 is likewise substantially constant.

Pedestal 30 is rigidly connected to or integrally formed with a hub 36 having a web section 37 and a collar section 38. The collar section 38 is wider than web section 37 and defines the generally circular opening 39 for accommodating the tubular workpiece 13 which may be a pipe to be welded.

Carriage 11 incorporates a generally open framework 40 of rectangular configuration. Framework 40 has a pair of hollow side walls 41 and 42 interconnected by an end wall 43. End wall 43 has a pair of outwardly projecting mounting blocks 44 and 45 formed through oppositely facing side sections with locking notches or slots 46 and 47 respectively. The other end wall 48 of framework 40 is generally hollow to serve as a housing or casing for a gear train 51, only partially shown.

Mounted to framework 40 is a holding means 49 having a gripping arm 50 which may be swivelled and height-adjusted to accommodate various purposes.

The holding means 49 may assume any conventional construction and configuration necessary to hold a particular type of instrument, tool, package or device. By way of example, the holding means may be structured to carry a welding head or component, a chemical applicator, a cutting tool, a painting or making device, inspection or scanning equipment a leakage detector, an ultra-sonic device, a measuring device, a package of instrumentation, or belt sanding apparatus.

Gear train 51 includes a spur gear 52 interconnected with a reversible electric motor 53 having an electrical power supply line 54.

A drive roller 56 spanning across the framework 40 is journalled within the opposing hollow side walls 41 and 42. The shaft or axle end of drive roller 56 projects into side wall 42 and is keyed to a gear component of the gear train 51. Drive roller 56 has a flexible covering in the form of multiple 0-rings 57 arranged in side-by-side relationship across the axis of drive roller 56. These tires or 0-rings 57 may be of standard neoprene material and serve to improve traction with the track unit exterior periphery 29 and furthermore facilitate overriding minor surface bumps and/or irregularities without jamming.

Depending from opposite sides of framework 40 is a pair of symmetrical posts 58 to which are linked a pair of relatively low slung swing arms 60 and 61. The swing arm ends 63 are formed with inwardly directed lugs having attachment holes slipped over pivot pins 64 associated with the posts 58. By thus pivotally coupling swing arms 60 and 61 to the framework 40, they may be selectively swung laterally outwardly or inwardly as indicated by directional arrow A. For purposes of illustration, the swing arm 60 is shown set in its operational position while the swing 61 is shown swung outwardly to an inoperative position.

Fastened to the inside walls of the swing arms 60 and 61 are pairs of tandemly oriented metal idler wheels 66 and 67. Both idler wheels 66 and 67 can be seen secured to the inside face of swing arm 60 while only one idler wheel 67 is secured to swing arm 61. When the idler wheels 66 and 67 are drawn fully inwardly to their operational positions they fit within the annular spaces or recesses in the opposing sides of the track unit 12. More specifically, the idler wheels 66 and 67 make rolling engagement with the track unit undercut zones 33 and 34.

The other ends of the swing arms 60 and 61 are pivotally connected to the lower ends of tie bolts 69 by way of pivot pins 69. The upper ends of the tie bolts 70 are coupled to locking means 71 which include tightening elements 72. When the swing arms 60 and 61 are swung inwardly and the tie bolts 70 are positioned in locking notches 46 and 47 then the tightening element 72 may be torqued manually to achieve a desired measure of tension. This tightening action of the locking means 71 forces drive roller 56 downwardly into forceful rolling engagement with track unit exterior periphery 29 and simultaneously the metal idler wheels 66 and 67 are snugged upwardly into forceful rolling engagement with the undercut zones 33 and 34.

By remotely actuating or otherwise energizing motor 53, the carriage 11 is caused to crawl along the track unit 12 with the drive roller 56 exerting a radially inwardly directed force against the track unit 12 and the idler wheels 66 and 67 exerting a radially outwardly directed force against the track unit 12. The combined effect of the rolling engagement and opposing forces permits the carriage 11 to firmly travel along track unit 12 without slippage or tumbling from the intended path of movement.

Referring now primarily to FIG. 2 the motor 53 has a power take-off shaft 74 extending entirely through a partition 48a of framework end wall 48 and a spur gear 52. A slip clutch mechanism 75 interconnects shaft 74 and spur gear 52 and is structured to commence slipping when the motor 53 becomes overloaded and burdened under circumstances of a predetermined level of torque.

Spur gear 52 has an outer face 76 and an inner face 77 aimed generally towards the motor 53. A diametrical slot 78 is formed in the spur gear outer face 76 and another diametrical slot 79, aligned perpendicular to slot 78, is also formed in face 76.

A drive pin 80 extends transversely through shaft end 81 and normally is held drivingly engaged within a diametrical slot 78 or 79 under the biasing force of a helical spring 82. Spring 82 is fixed at one end to gear 52 which may slide along shaft 74 and is fixed at the other end to stationary partition 48a.

Gear 52 is ordinarily driven by the force of drive pin 80 in one of slots 78 or 79. When the drive train 51 becomes greatly burdened, the slip clutch mechanism 75 functions to prevent damage to the motor 53 which might otherwise burn out. When an overload condition occurs, the drive pin 80 will lift out of one slot, slip across gear outer face 76, slide in and out of the next slot, etc. - causing a clicking noise to signal a danger condition requiring attention.

Figure 3:
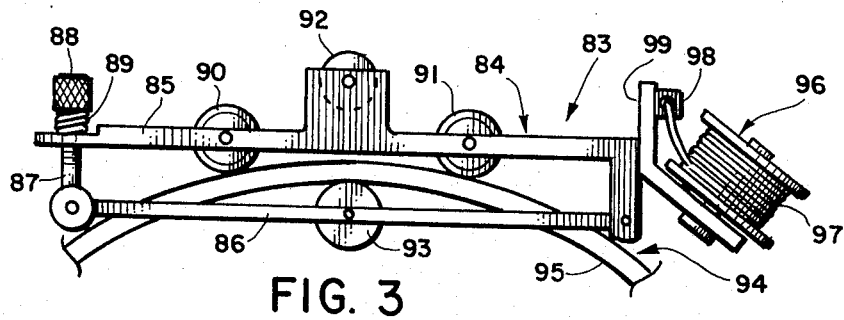
FIG. 3 is essentially a schematic side elevational view of a carriage having two drive rollers instead of one drive roller as illustrated in connection with FIG. 1; and, FIG. 4 is a perspective view of a carriage and track unit assembly that is especially modified to transport an automatic pipe welding system.

Referring now primarily to FIG. 3 another embodiment of a carriage and track assembly 83 is schematically illustrated. A carriage 84 incorporates a rectangular open framework 85 that includes a pair of relatively low-slung swing arms 86. Tie bolts 87 and locking means 88 releasably interconnect the swing arms 86 with the framework. A compensating means 89 in the form of a coil spring is positioned between framework 85 and locking means 88. The compensating means is essentially a pair of spring loaded take up elements coupled to corresponding swing arms to assist in easing the carriage 84 over bumps and other surface obstructions instead of becoming stalled or significantly impeded.

The drive roller means for this embodiment is in the form of a pair of tandemly aligned drive rollers 90 and 91, each being constructed in the same general manner as drive roller 56 described in connection with FIG. 1. A relatively elevated motor 92 mounted across the framework 85 may be selectively operated to drive the dual drive rollers 90 and 91 over the external periphery of track unit 94. Single idler wheels 93 associated with the swing arms 86 maintain rolling engagement with corresponding undercut zones 95 that define the laterally spaced lower guide ways. In this construction, the single idler wheels associated with the swing arms 86 are mutually aligned with their axes positioned centrally of the drive rollers 90 and 91.

A spool 96 is shown carrying wire 97 extending through a guide block 98. Spool 96 is suitably fixed to the carriage 84 by way of a bracket or plate 99.

Two or more articulated carriages may be coupled in train fashion to haul additional equipment or material along the predetermined path established by the track unit. Moreover, the principal components of a carriage and track unit assembly constructed in accordance with this invention could be rearranged so that the drive roller or rollers could be positioned radially inwardly, i.e., inside a pipe or tube for example, relative to the idler wheels.

Figure 4:
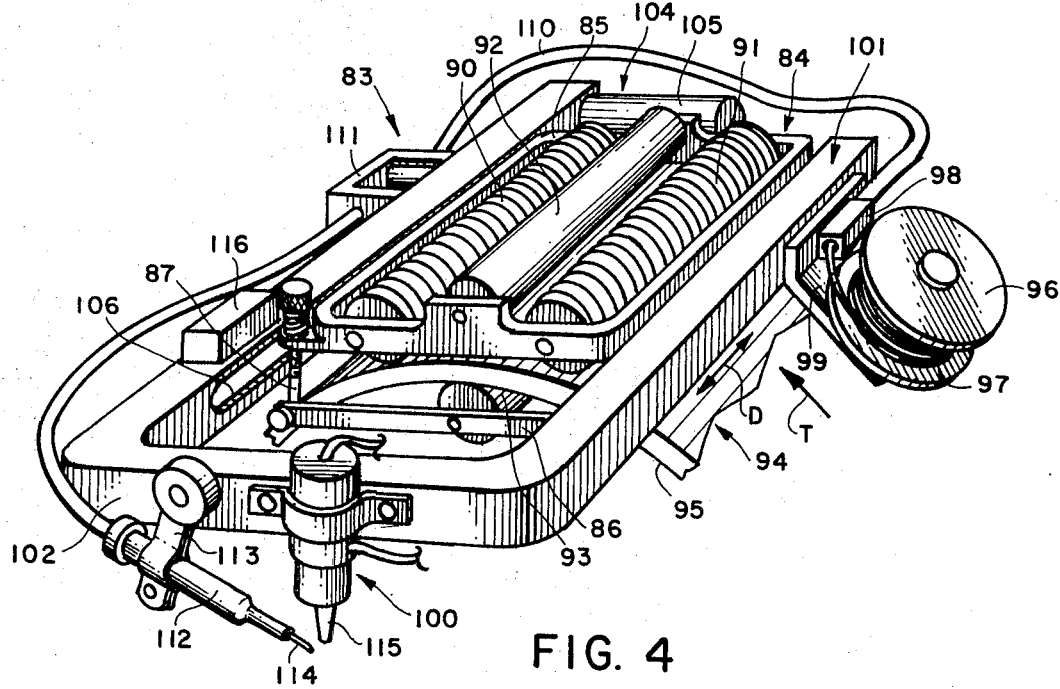

FIG. 4 shows a carriage and track assembly 83 combined with an automatic pipe welding system 100 illustrated basically schematically but with some general details.

A cross framework 101 of rectangular or U-shape generally surrounds the principal framework 85 and is capable of being shifted crosswise or transversely as indicated by directional arrow D relative to the path of travel of principal framework 85 indicated by direction arrow T. The cross framework 101 has a side wall 102 which generally overhangs one side of the track unit 94.

Framework 85 and cross framework 101 are coupled in part through an oscillating means 104 that includes a reversible motor 105 that may be selectively programmed and energized to urge the cross framework 101 through predetermined lateral excursions. A conventional slide and way system 106 guides the mechanical travel of cross framework 101 relative to the principal framework 85.

The spool 96 in this embodiment of the invention carries a supply of weld feeder wire 97 which passes through the guide block 98 into an elongated guide tube 110 which leads to a self-aligning wire feeder 111. The wire feeder 111 may, for example, consist of two grooved drive rollers, one fixed and one spring loaded and two feed guides which align the filler wire with respect to the drive rollers. Wire exiting from the wire feeder 111 is forced through a wire positioner 112 secured in place by an adjustable holding means 113. The holding means 113 is depicted schematically but may be adjustably positionable. Weld wire 114 exiting the wire positioner 112 is fed beneath a welding torch 115. The wire positioner 112 and welding torch 115 are generally coupled to the same side wall 102 of cross framework 101. The welding torch is preferably held by a radially adjustable mechanism so that it may be selectively and periodically raised and lowered relative to a weld joint being formed.

A control feedback means 116 is secured to cross framework 101 and is equipped to synchronize and regulate various welding parameters and functions such as arc voltage, weld current pulsing and intensity, the excursion limits for displacement by cross framework 101, etc. The welding torch 115 may be of any conventional type such as tungsten inert gas, i.e., TIG or metal inert gas, i.e., MIG.

An arc voltage control mechanism, consisting of a motor driven slide to which the torch 115 is mounted, adjusts the position of the tungsten with respect to the workpiece surface.

As carriage 84 is urged to crawl along track unit 94 the continuously fed weld wire 114 and welding torch 115 simultaneously traverse the intended weld joint by generally following a zig-zag path.

OPERATION

Keeping the above constructions in mind, it can be understood how the advantages and objectives of this invention can be fully realized.

To operate a carriage and track unit assembly for general mechanical reasons, with reference to the FIGS. 1 and 2 embodiment, a specially constructed track unit 12 of predetermined size is first selected with reference to the outer diameter of the tubular workpiece or pipe 13.

The split ring sections 14 and 15 are relatively positioned around the pipe 13 by aid of the locating pins 22 and complimentary locating apertures 23. The elongated fastening bolts 18, arranged in chordal alignment are then tightened.

The track unit 12 is then firmly installed over the pipe 13 by adjusting the equiangularly spaced centering elements 25.

With the track unit 12 thus stably but removably secured on the pipe 13, the carriage 11 is held generally in place with the drive roller 56 resting on the track external periphery 29.

The swing arms 60 and 61 are pivoted mutually inwardly until their associated idler wheels 66 and 67 become positioned beneath the track unit side sections 31 and 32 and the tie bolts 69 become inserted in their corresponding locking slots 46 and 47.

The tightening elements 72 are torqued downwardly causing the swing arms 60 and 61 to rotate upwardly. When the necessary or pre-determined amount of force is exerted upwardly by the idler wheels 66 and 67 and downwardly by the drive roller 56, then the tightening element 72 are released.

The drive motor 53 may thereafter be selectively energized causing the gear train 51 to transmit rotary movement to the drive roller 56. The carriage 10 is thus caused to crawl along the track unit 12 with the drive roller 56 being thrust downwardly against the track unit external periphery 29 and the idler wheels 66 and 67 being snugged upwardly against the track unit undercut zones or guide ways 33 and 34.

From the foregoing described details and explanation of operation, it will be evident that this invention has provided a crawling carriage in which all of the various advantages are fully realized. While the principal, preferred constructions, and mode of operation have been described in connection with particular embodiments for purposes of illustration, it should be understood that the invention may be practiced in other forms within the scope of the claims.

1. A carriage and track combination comprising:
  a. a track unit with side parts defining undercut zones that constitute a pair of guide ways;
  b. a carriage having a framework;
  c. drive roller means coupled to the framework and arranged in rolling engagement with the track unit;
  d. A motor coupled to the framework and operatively connected to the drive roller means for selectively causing movement of the drive roller means over the track unit;
  e. a pair of swing arms pivotally coupled to opposing sides of the framework;
  f. idler wheel means secured to the swing arms and positioned below the drive roller means for movement into rolling engagement with the pair of guide ways;
  g. locking means for tightening the swing arms and thereby simultaneously forcing the drive roller means against the track unit and the idler wheel means against the guide ways
  h. a cross framework coupled to an outside portion of said framework;
  i. a slide and way system interconnecting said framework and the cross framework; and,
  j. a reversible motor mounted to said framework and drivingly engaged with the slide and way system and arranged to shift the cross framework back and forth laterally relative to the path of movement of said framework, whereby the carriage may be caused to crawl along the track unit with the drive roller means exerting force against the track unit in one direction and the idler wheel means exerting force against the track unit in the opposite direction and whereby the cross framework may be caused to shift back and forth across the path of movement of the carriage.

2. The structure according to claim 1 wherein:
  the drive roller means includes dual and tandemly aligned drive rollers; and,
  the idler wheel means includes single idler wheels secured to corresponding swing arms and positioned centrally of the dual drive rollers.

3. The structure according to claim 1 wherein:
  the drive roller means includes a single drive roller; and,
  the idler wheel means includes a set of idler wheels coupled to each swing arm, each set having a pair of idler wheels on opposite sides of the single drive roller axis.

4. The structure according to claim 1 wherein the drive roller means includes:
  a flexible covering to improve traction with the track unit.

5. The structure according to claim 4 wherein:

a plurality of resilient 0-rings are arranged in side-by-side relationship substantially across the drive roller means.

6. The structure according to claim 1 wherein:
the tract unit is of generally annular shape and includes mating split ring sections that are detachably fastened together.

7. The structure according to claim 6 wherein the track unit includes:
a pedestal; and,
a hub connected to the pedestal, having a generally circular opening for accommodating a tubular workpiece.

8. The structure according to claim 6 including:
clamping means with at least three adjustable and substantially equiangularly spaced centering pads that extend radially through the split ring sections.

9. The structure according to claim 6 wherein:
locating pins and apertures are positioned at mating end portions of the split ring sections to assist in orienting and fitting them together;
the split ring sections are detachably fastened together with bolts extending through the mating end portions of the split ring sections, and,
the upper surface portion of the pedestal is roughened to improve traction between the drive roller means and track unit.

10. The structure according to claim 1 wherein:
the swing arms straddle the track unit and are pivoted to swing laterally inwardly toward the framework to facilitate positioning the idler wheels beneath the track unit side parts.

11. The structure according to claim 1 wherein the locking means includes:
a pair of locking slots formed in the framework;
a pair of tie bolts pivotally connected to corresponding swing arms and having free ends that extend through corresponding locking slots; and,
tightening elements connected to the tie bolts free ends for regulating the holding force exerted by the drive roller means and idler wheel means against the track unit.

12. The structure according to claim 11 including:
compensating means coupled to the locking means and arranged to allow slight displacement by the idler wheel means upon encountering irregular surface conditions on the track unit.

13. The structure according to claim 12 wherein the compensating means includes:
a pair of coil springs which act as take up elements and are positioned over the tie bolts and between the locking slots and tightening elements.

14. The structure according to claim 1 wherein:
the motor has a power take-off shaft; and,
a slip clutch mechanism is positioned between the motor and drive roller means, structured to cause slippage when a predetermined torque is exerted on the power take-off shaft.

15. The structure according to claim 14 including:
a gear train interconnecting the power take-off shaft and drive roller means;
a spur gear of the gear train coupled to the power take-off shaft and having an outer face aimed away from the motor that is formed with a diametrical slot and,
a drive pin extending transversely through the power take-off and normally spring loaded and drivingly engaged within the diametrical slot,
wherein when the predetermined torque level is achieved the drive pin will be urged in and out of the diametrical slot to slip across the spur gear outer face.

16. The structure according to claim 15 including:
a pair of diametrical cross slots in the spur gear outer face, and,
a helical spring on the power take-off shaft, extending between a fixed point and the other face of the spur gear to normally hold the drive pin in one of the cross slots.

17. The structure according to claim 1 including:
pipe welding means mounted to the carriage.

18. The structure according to claim 17 wherein the pipe welding means includes:
a welding torch connected to one side of the carriage;
a wire positioner connected to the same side of the carriage; and,
filler wire feeder means for supplying filler wire through the wire positioner and to the welding torch.

19. A carriage and track assembly in combination with a pipe welding means comprising:
a. a track unit including a pedestal of substantially constant width, the pedestal having side parts of substantially constant depth and which define undercut zones said track unit being of generally annular shape and including mating split ring sections that are detachably fastened together, the track unit including a hub connected to the pedestal having a generally circular opening for accommodating a tubular work piece to be welded, and clamping means having at least three adjustable and substantially equiangularly spaced centering pads that extend radially through the split ring sections;
b. a central path of movement defined by an outer surface portion of the pedestal;
c. a pair of guide ways defined by the undercut zones;
d. a carriage for carrying said pipe welding means and including a framework;
e. dual drive rollers coupled to the framework and arranged in rolling engagement against the central path portion of the pedestal;
f. a motor coupled to the framework and operatively connected to the drive rollers for selectively causing movement of the drive rollers along the central path;
g. a pair of swing arms pivotally coupled to opposing sides of the framework, said swing arms being oriented to straddle the track unit and swing laterally inwardly towards the framework;
h. idler wheels secured to corresponding swing arms for movement into rolling engagement with corresponding guide ways at positions central of the dual drive rollers; and
i. locking means operable to tighten the swing arms and thereby simultaneously force the dual drive rollers against the track unit and the idler wheels against the guide ways;
wherein the carriage may be caused to crawl along the track to follow an orbital path with the drive rollers exerting force against the track in one direction and the idler wheels exerting force against the track unit in the opposite direction as the welding means traverses a weld joint.

20. The structure according to claim 19 including a cross framework coupled to an outside portion of said framework;

and oscillating means for selectively shifting the the cross framework laterally relative to the path of movement of said framework, the oscillating means including a slide and way system interconnecting said framework and cross framework, and, a reversible motor mounted to the framework and drivingly engaged with the slide and way system and arranged to shift the cross framework back and forth; and, a fillar wire feeder means for supplying filler wire through the wire positioner and to the welding torch.

* * * * *